(12) United States Patent
Fan

(10) Patent No.: US 8,174,438 B2
(45) Date of Patent: May 8, 2012

(54) POSITIONING APPARATUS AND METHOD

(75) Inventor: Yung-Chi Fan, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 203 days.

(21) Appl. No.: 12/685,284

(22) Filed: Jan. 11, 2010

(65) Prior Publication Data
US 2010/0182194 A1 Jul. 22, 2010

(30) Foreign Application Priority Data

Jan. 20, 2009 (TW) .............................. 98102068 A

(51) Int. Cl.
G01S 19/05 (2010.01)
(52) U.S. Cl. ................................. 342/357.42
(58) Field of Classification Search ............ 342/357.29, 342/357.42
See application file for complete search history.

(56) References Cited

U.S. PATENT DOCUMENTS

| 2006/0234624 | A1* | 10/2006 | Yeh | 455/3.02 |
| 2007/0183486 | A1* | 8/2007 | Cheng et al. | 375/150 |
| 2008/0174405 | A1* | 7/2008 | Toorn | 340/10.1 |
| 2010/0057334 | A1* | 3/2010 | Ramaswamy et al. | 701/117 |
| 2010/0141385 | A1* | 6/2010 | Shiau et al. | 340/10.1 |

* cited by examiner

Primary Examiner — Harry Liu
(74) Attorney, Agent, or Firm — Edell, Shapiro & Finnan, LLC

(57) ABSTRACT

A positioning apparatus and the associated positioning method are provided. The positioning apparatus includes a wireless communication unit, a storage unit, a positioning module and a control unit. The wireless communication unit generates a detection signal. The storage unit coupled to the wireless communication module stores assistance positioning data. The positioning module coupled to the storage unit generates coordinate information according to a satellite signal and the assistance positioning data. The control unit coupled to the wireless communication module, the storage unit and the positioning module determines whether the assistance positioning data is valid. When the assistance positioning data is invalid, the control unit controls the wireless communication module to generate the detection signal.

13 Claims, 4 Drawing Sheets

POSITIONING APPARATUS AND METHOD

CROSS REFERENCE TO RELATED PATENT APPLICATION

This patent application is based on Taiwan, R.O.C. patent application No. 98102068 filed on Jan. 20, 2009.

FIELD OF THE INVENTION

The present invention relates to a positioning apparatus and method thereof, and more particularly, to a positioning apparatus and method capable of receiving from other positioning apparatuses valid assistance positioning data and/or a positioning result regarded as coordinate information of the positioning apparatus.

BACKGROUND OF THE INVENTION

A global positioning system (GPS) is a satellite navigation system in middle earth orbit (MEO). Generally, the GPS has 24 GPS satellites orbiting on six orbital planes in space to perform triangle positioning. Each of the satellites transmits signals to GPS terminals at all times. The signals comprising information such as coordinates, time or other parameters are the key elements for positioning accurately.

An assisted global positioning system (AGPS) has now also been developed. Signals transmitted from a mobile phone base station with signals from conventional GPS satellites are applied to accelerate positioning speed. In an AGPS network, a receiver obtains assistance positioning data by communicating with a server. Therefore, the positioning speed is faster than that of a conventional GPS system while also having a higher efficiency.

At present, a GPS terminal apparatus has to download assistance positioning data via a network in advance. It implies that, with respect to a conventional apparatus capable of downloading assistance positioning data via a network, regardless of whether a mobile phone network or a Wi-Fi network is used, a user has to spend additional fees and time to connect to the network in order to obtain the assistance positioning data. For the majority of GPS apparatuses that are incapable of downloading assistance positioning data via the network, even more time is needed to wait for a cold start.

However, downloading the assistance positioning data via the network has limitations. When signals from the network are too weak or even cannot be obtained, the positioning apparatus is unable to provide stable and reliable positioning information. In addition, boot time may cause further inconvenience. In other words, the foregoing approaches do not necessarily reduce positioning time effectively or increase positioning efficiency.

SUMMARY OF THE INVENTION

One object of the present invention is to provide a positioning apparatus capable of receiving valid assistance positioning data from other positioning apparatuses and performing a positioning procedure according to the received data, or receiving a positioning result from other positioning apparatuses and regarding the received result as coordinate information thereof. Accordingly, the positioning apparatus according to the present invention is capable of providing stable and reliable positioning information as well as reducing positioning time, thereby solving problems of the prior art.

According to an embodiment, a positioning apparatus comprises a wireless communication module, a storage unit, a positioning module and a control unit. The wireless communication module generates a detection signal. The storage unit, coupled to the wireless communication module, stores assistance positioning data. The positioning module, coupled to the storage unit, generates coordinate information according to a satellite signal and the assistance positioning data. The control unit, coupled to the wireless communication module, the storage unit and the positioning module, determines whether the assistance positioning data is valid. When the assistance positioning data is invalid, the control unit controls the wireless communication module to generate the detection signal.

Furthermore, the detection signal is used for detecting whether another positioning apparatus having valid assistance positioning data and a positioning result exists near the positioning apparatus. When the answer is yes, the wireless communication module establishes a communication link with the another positioning apparatus in order to receive the valid assistance positioning data and the positioning result, which are then regarded as the coordinate information of the positioning apparatus.

Another object of the present invention is to provide a positioning method capable of receiving valid assistance positioning data from other positioning apparatuses and performing a positioning program according to the valid assistance positioning data, or receiving a positioning result from other apparatuses and regarding the positioning result as coordinate information thereof. Accordingly, the positioning method according to the present invention is capable of providing stable and reliable positioning information as well as reducing positioning time.

According to an embodiment, a positioning method applied to a positioning apparatus having stored therein or loaded with assistance positioning data is provided. The positioning method comprises steps of determining whether the assistance positioning data is valid; when the assistance positioning data is invalid, generating a detection signal to detect whether another positioning apparatus exists near the positioning apparatus, wherein the another positioning comprises valid assistance positioning data and a positioning result; and establishing a communication link between the positioning apparatus and the another apparatus, and receiving the valid assistance positioning data and the positioning result, with the positioning result being regarded as coordinate information of the positioning apparatus.

In conclusion, a positioning apparatus and method according to the present invention is capable of receiving valid assistance positioning data from other positioning apparatuses and of performing a positioning procedure according to the data, or receiving a positioning result from other positioning apparatuses and regarding the result as coordinate information thereof. Accordingly, the positioning apparatus and method according to the present invention provides stable and reliable positioning information and reduces positioning time. Furthermore, the positioning apparatus according to the present invention obtains associated positioning data in real-time from a neighboring positioning apparatus via wireless communication, so as to obtain accurate coordinate information and further achieve an object of updating the coordinate information in real-time.

The advantages and spirit related to the present invention can be further understood via the following detailed description and drawings.

DETAILED DESCRIPTION OF THE PREFERRED EMBODIMENT

Figure 1:
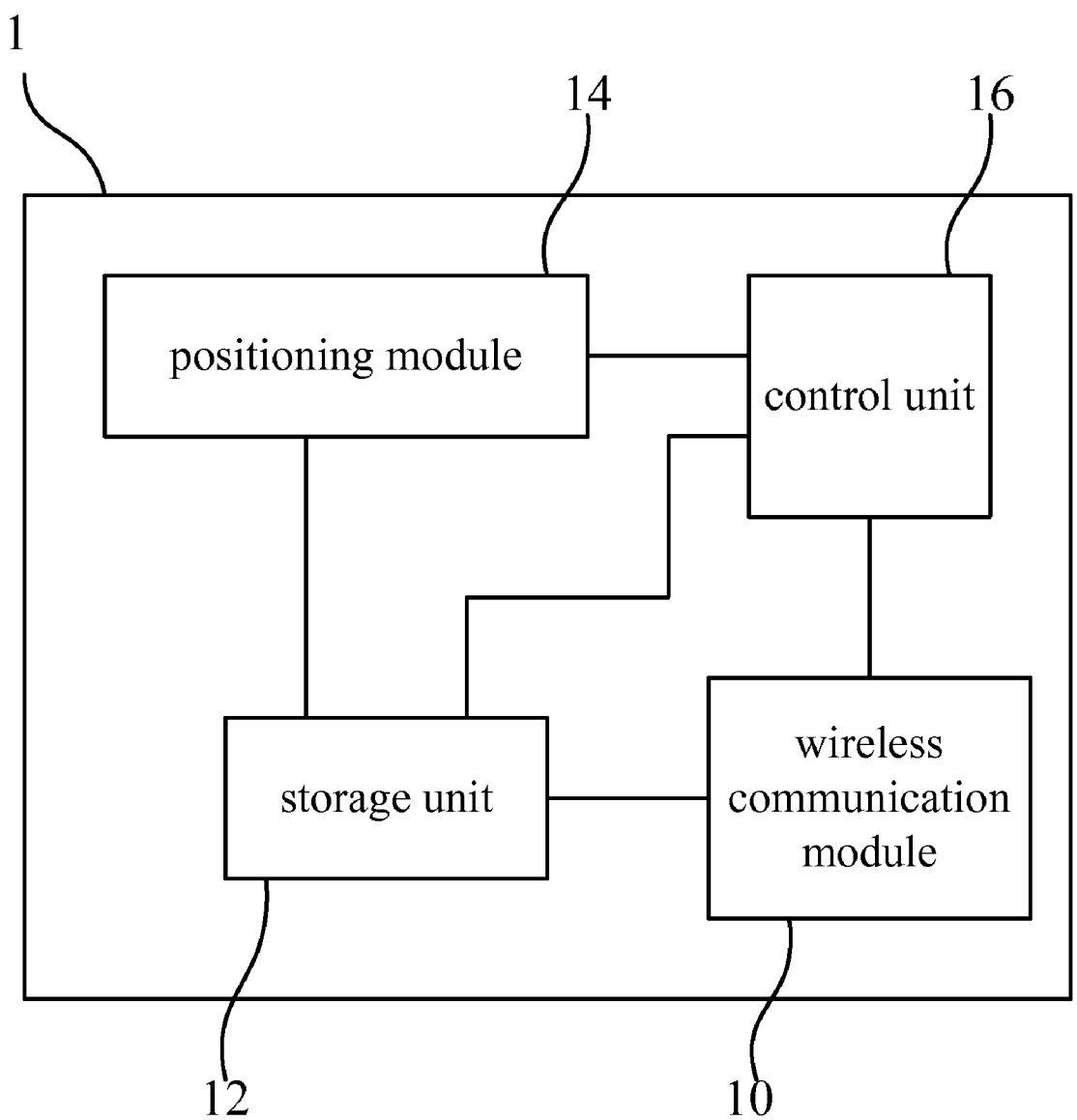
FIG. 1 is a functional block diagram of a positioning apparatus in accordance with an embodiment of the present invention.
Figure 2:
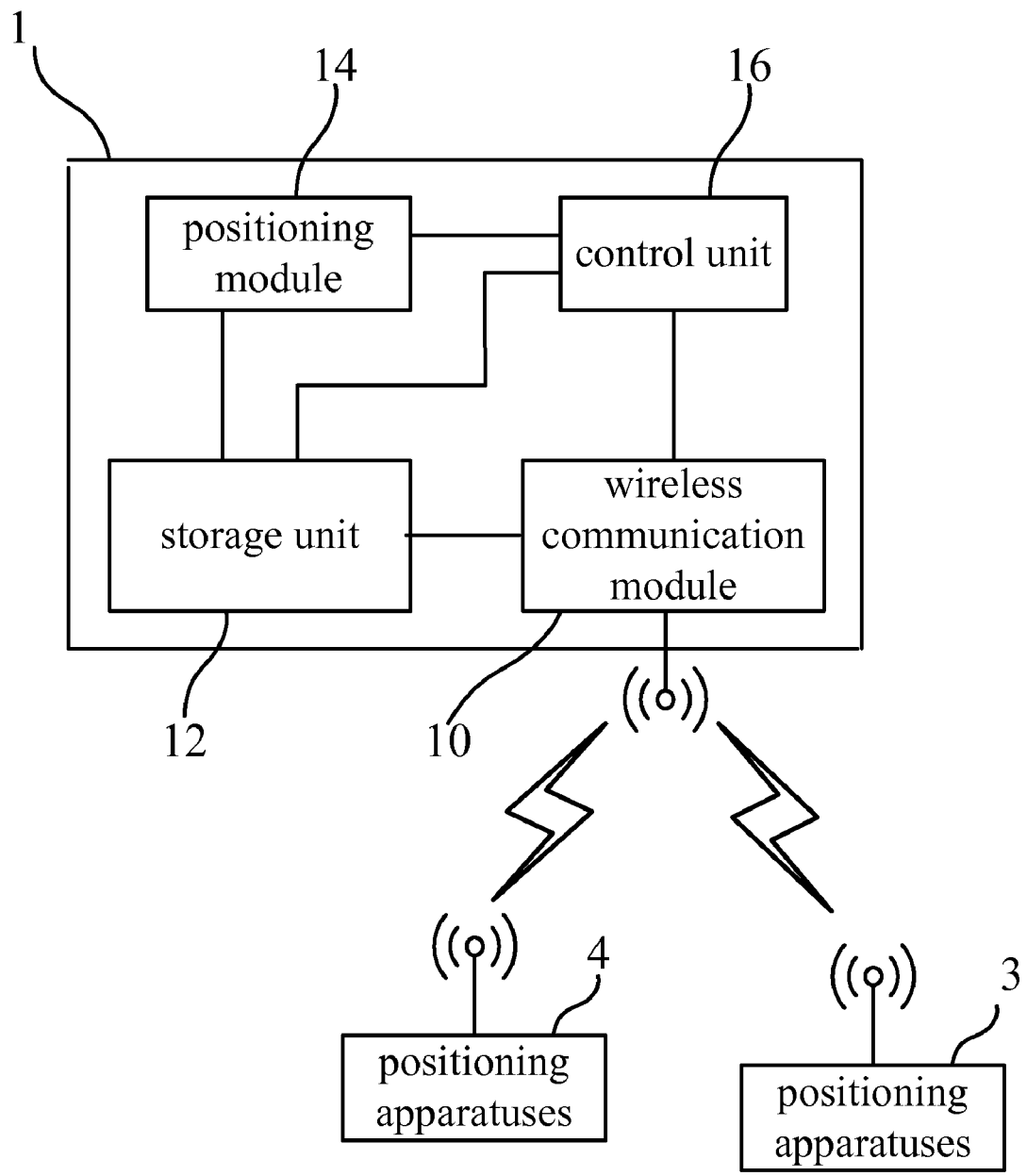
FIG. 2 is a schematic diagram of a positioning apparatus communicating with another positioning apparatus.

Referring to FIG. 1 and FIG. 2, FIG. 1 shows a functional block diagram of a positioning apparatus 1 in accordance with an embodiment of the present invention, and FIG. 2 shows the positioning apparatus 1 communicating with other positioning apparatuses 3 and 4. The positioning apparatus 1 comprises a wireless communication module 10, a storage unit 12, a positioning module 14 and a control unit 16. In addition, the positioning apparatus 3 is stored (i.e., loaded) with a valid assistance positioning data and a positioning result, whereas the positioning apparatus 4 is not stored with any valid assistance positioning data or is stored with invalid assistance positioning data. Generally speaking, the assistance positioning data has a fixed validity duration, and the assistance positioning data becomes invalid once the validity duration expires.

The wireless communication module 10 generates a detection signal for detecting whether another positioning apparatus (positioning apparatus 3) having valid assistance positioning data and/or positioning result exists near the positioning apparatus 1. Moreover, in this embodiment, the wireless communication module 10 is a radio frequency identification (RFID) communication module having a reader mode and a tag mode.

The storage unit 12 coupled to the wireless communication module 10 stores assistance positioning data. The positioning module 14, coupled to the storage unit 12, generates coordinate information associated with the positioning apparatus 1 according to a satellite signal and the assistance positioning data.

The control unit 16, coupled to the wireless communication module 10, the storage unit 12 and the positioning module 14, determines whether the assistance positioning data stored in the storage unit 12 is valid. When the result is yes, the control unit 16 controls the wireless communication module 10 to enter the tag mode. Under the tag mode, the wireless communication module 10 receives a detection signal from other positioning apparatuses such as the positioning apparatus 4, and transmits the assistance positioning data stored in the storage unit 12 to the positioning apparatus 4 according to the detection signal.

On the contrary, when it is determined that the assistance positioning data stored in the storage unit 12 is invalid, the control unit 16 controls the wireless communication module 10 to enter the reader mode to generate the detection signal. As mentioned above, the detection signal is capable of detecting the existence of the positioning apparatus 3 having the valid assistance positioning data and the positioning result.

In a practical application, since the validity of the assistance positioning data is time-bound, the control unit 16, such as an AGPS control center (ACC) chip, periodically checks the assistance positioning data stored in the storage unit 12 to determine whether the assistance positioning data is valid. The control unit 16 controls the wireless communication module 10 to enter the reader mode or the tag mode according to each of the determining results.

When detecting the positioning apparatus 3 via the detection signal, the wireless communication module 10 establishes a communication link with the positioning apparatus 3 and receives the valid assistance positioning data and/or positioning result stored in the positioning apparatus 3. After that, the positioning result of the positioning apparatus 3 is regarded as the coordinate information of the positioning apparatus 1. It is to be noted that, the wireless communication module 10 of this embodiment is an RFID communication module that has a short transmission distance, which implies that the positioning apparatus 1 is not far from the positioning apparatus 3. Therefore, an error from using the positioning result of the positioning apparatus 3 as the coordinate information of the positioning apparatus 1 is correspondingly small.

However, when the distance between the positioning apparatus 1 and the positioning apparatus 3 becomes large (e.g., when two users respectively holding the positioning apparatus 1 and the positioning apparatus 3 move in opposite directions, especially with a fast speed), the error of the coordinate information generated accordingly becomes larger. At this point, the positioning apparatus 1 of the present invention can be positioned again according to the received assistance positioning data, so as to improve positioning accuracy.

Furthermore, in this embodiment, the positioning apparatus 1 has a first identification code, and the positioning apparatus 3 has a second identification code. When receiving the detection signal transmitted from the wireless communication module 10 of the positioning apparatus 1, the positioning apparatus 3 transmits the second identification code to the positioning apparatus 3. After receiving the second identification code, the positioning apparatus 1 transmits the first identification code to the positioning apparatus 3. In other word, the foregoing communication link between the positioning apparatus 1 and positioning apparatus 3 is thus established according to the first and second identification codes.

After the valid assistance positioning data of the positioning apparatus 3 is transmitted to the positioning apparatus 1 via the communication link, the valid assistance positioning data is divided into a plurality of packets, each of which respectively comprises remaining length information for indicating the length of packets not yet transmitted. In addition, the positioning apparatus 1 receives the plurality of packets via the wireless communication module 10 and stores the packets into the storage unit 12. The wireless communication module 10 learns the number of packets to be received by checking the remaining length information of the packets.

In an embodiment, when transmission of the assistance positioning data is incomplete, and a certain amount (e.g., at least two packets) of the assistance positioning data is not received by the wireless communication module 10 within a predetermined time, it means that the foregoing communication link may be interrupted. At this point, the control unit 16 deletes the received packets stored in the storage unit 12 and controls the wireless communication module 16 to transmit a detection signal again to re-establish a communication link between the positioning apparatus 3 and other positioning apparatuses having a valid assistance positioning data. In another embodiment, when the wireless communication module 10 receives a first packet and does not successfully receive a second packet within a predetermined time, the wireless communication module 10 continues to transmit a same request to the positioning apparatus 3 for several times. When the second packet is still not received, the positioning apparatus 1 discards the first packets received and the wireless communication module 10 transmits the detection signal again. It is to be noted that, the foregoing embodiments are merely examples and should not limit the scope of the claims herein.

In addition, in a practical application, after the valid assistance positioning data is transmitted, the control unit 16 determines whether the valid assistance positioning data is correct via a checksum. For example, it is determined whether a packet length is correct or content of the assistance positioning data is complete. When the result indicates that the valid assistance positioning data is incorrect, the control unit 16 deletes the received packets stored in the storage unit 12 and controls the wireless communication module 10 to transmit a detection signal again, so as to re-establish a communication link between the positioning apparatus 3 and other positioning apparatuses having a valid assistance positioning data.

It is to be noted that, in a practical application, when the positioning apparatus 1 simultaneously finds various positioning apparatuses having valid assistance positioning data, the positioning apparatus 1 defines a priority sequence in establishing a communication link with the positioning apparatuses according to, e.g., signal intensity, distance and other parameters between the positioning apparatus 1 and the positioning apparatuses.

In a practical application, the positioning apparatus 1 according to the present invention is an electronic device having a positioning function, such as a GPS mobile phone or a portable navigation device (PND). Therefore, the positioning apparatus 1 may be an independent GPS receiver, or an electronic device having various data processing functions, such as a mobile phone or an automobile computer having a GPS receiving function. The mobile phone or automobile computer executes navigation software based on data stored in a storage media to perform a positioning method according to the present invention according to a positioning signal received by a GPS receiver.

Figure 3:
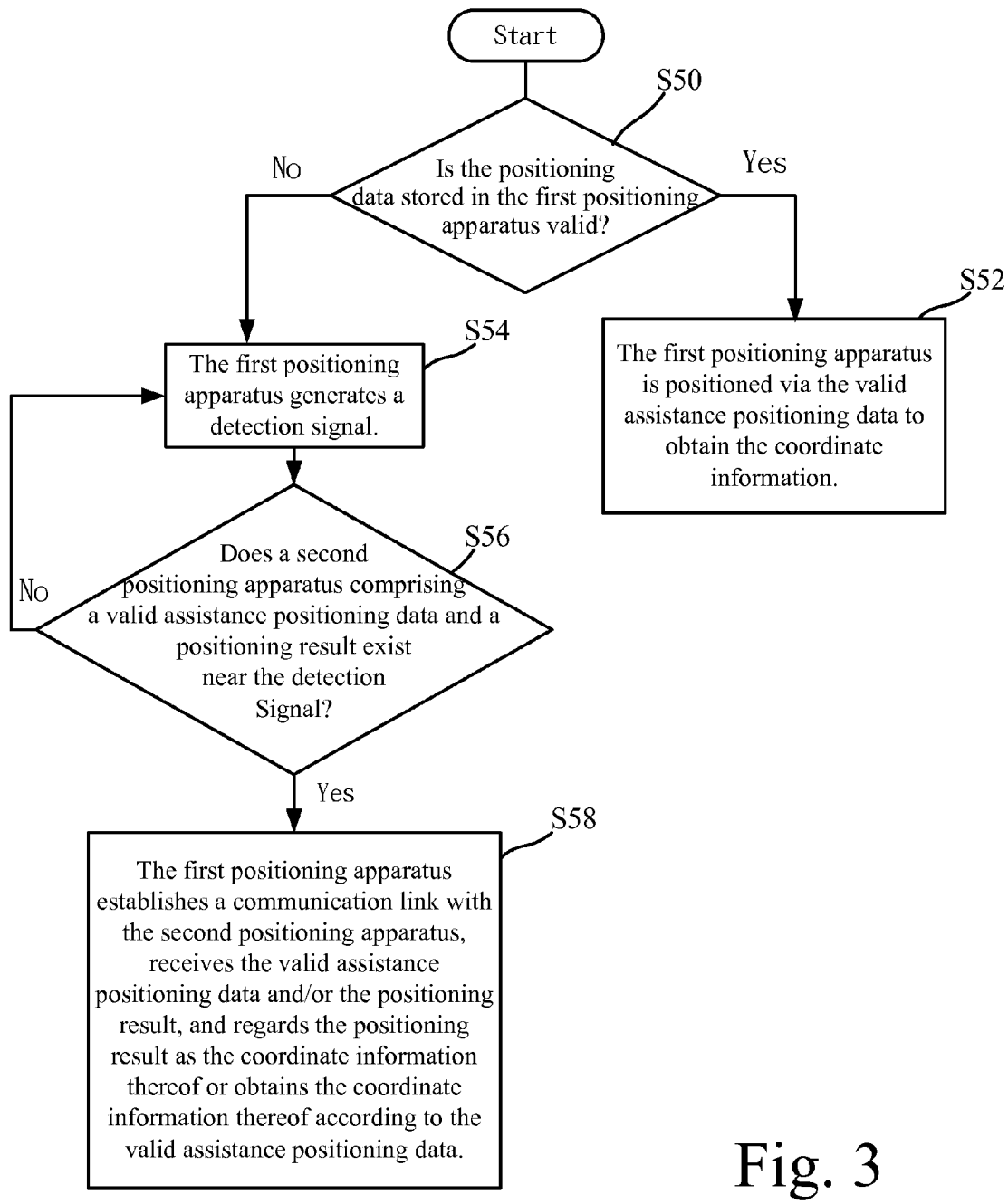
FIG. 3 is a flow chart of a positioning method in accordance with an embodiment of the present invention.

FIG. 3 is a flow chart of a positioning method in accordance with an embodiment of the present invention. The positioning method is applied to a first positioning apparatus to facilitate the first positioning apparatus to obtain its coordinate information. In this embodiment, the first positioning apparatus is stored, or loaded, with assistance positioning data. The positioning method comprises steps below.

In Step S50, it is determined whether the positioning data stored in the first positioning apparatus is valid. For example, Step S50 is activated by a user or automatically activated by the first positioning apparatus.

When the answer of Step S50 is yes, Step S52 is performed. In Step S52, the first positioning apparatus is positioned via the valid assistance positioning data to obtain the coordinate information. In addition, when the answer of Step S50 is yes, an RFID communication module is controlled to enter a tag mode according to the positioning method of the present invention. Under the tag mode, the RFID communication module receives a detection signal from other positioning apparatuses, and selectively transmits valid assistance positioning data to other positioning apparatuses in response.

On the contrary, when the answer of Step S50 is no, Step S54 is performed. In Step S54, the first positioning apparatus generates a detection signal. Step S56 is then performed. In Step S56, whether a second positioning apparatus comprising valid assistance positioning data and a positioning result exists near the detection signal is detected. In a practical application, an RFID communication module is controlled to enter a reader mode according to the positioning method of the present invention to generate a detection signal. Further, it is possible that more than one second positioning apparatus receives the detection signal.

When the second positioning apparatus exists, Step S58 is performed. In Step S58, the first positioning apparatus establishes a communication link with the second positioning apparatus, receives the valid assistance positioning data and the positioning result, and regards the positioning result as the coordinate information thereof or obtains the coordinate information thereof according to the valid assistance positioning data.

Moreover, in a practical application, the first positioning apparatus has a first identification code and the second positioning apparatus has a second identification code. The step of establishing the communication link between the first positioning apparatus and the second positioning apparatus further comprises transmitting the second identification code by the second positioning apparatus to the first positioning apparatus in response to the detection signal. For example, the second positioning apparatus may not transmit the second identification code based on a decision of a user or other factors. After receiving the second identification code, the first positioning apparatus transmits the first identification code to the second positioning apparatus and establishes a communication link with the second positioning apparatus according to the first and the second identification codes. On the contrary, when the second positioning apparatus does not exist, the first positioning apparatus periodically generates the detection signal for detection, i.e., Step S54 is repeated. At this point, an invalid assistance positioning data stored in the first positioning apparatus is also used for positioning and reminding the user of a current situation.

Figure 4:
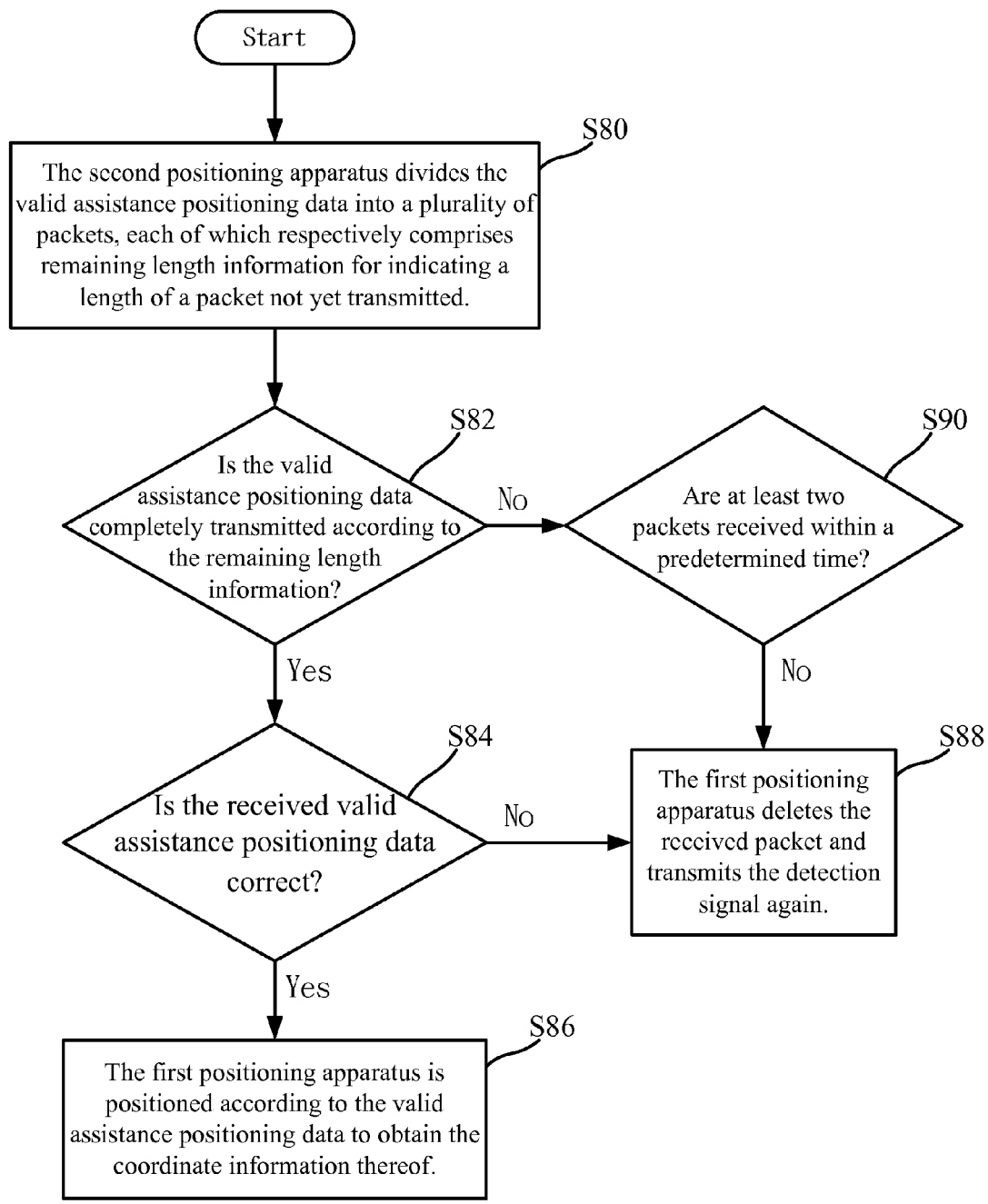
FIG. 4 is a flow chart of a positioning method in accordance with an embodiment of the present invention.

Following description further describes a transmission process of the valid assistance positioning data transmitted between the foregoing first positioning apparatus and the second positioning apparatus, and steps after the positioning apparatus receives the valid assistance positioning data. FIG. 4 shows a flow chart of a positioning method in accordance with an embodiment of the present invention. The positioning method further comprises steps below.

In Step S80, after the first positioning apparatus establishes the communication link with the second positioning apparatus, the second positioning apparatus divides the valid assistance positioning data into a plurality of packets, each of which respectively comprises remaining length information for indicating a length of a packet not yet transmitted. For example, when the second positioning apparatus divides the valid assistance positioning data into ten packets, the first packet comprises a remaining length value "9", the second packet comprises a remaining length value "8", the third packet comprises a remaining length value "7", . . . , and the tenth packet comprises a remaining length value "0".

In Step S82, the first positioning apparatus determines whether the valid assistance positioning data is completely transmitted according to the remaining length information. When the answer of Step S82 is yes, S84 is performed. In Step S84, the first positioning apparatus checks whether the valid assistance positioning data is correct via a checksum. For example, it is determined whether a packet length is correct or content of the assistance positioning data is complete. When the answer of Step S84 is yes, Step S86 is performed. In Step S86, the first positioning apparatus is positioned according to the valid assistance positioning data to obtain the coordinate information thereof. When the answer of Step S84 is no, Step S88 is performed, in which the first positioning apparatus deletes the received packet and transmits the detection signal again.

On the contrary, when the result of Step S82 is no, Step S90 is further performed. In Step S90, the first positioning apparatus determines whether at least two packets are received within a predetermined time. When the answer of Step S90 is no, the method returns to Step S88 in which the first positioning apparatus deletes the received packets and transmits the detection signal. When the answer of Step S90 is yes, the first positioning apparatus continues to wait to receive the remaining packets within a time limit. When the remaining packets are not received, the first positioning apparatus deletes the received packets and transmits the detection signal again.

In conclusion, the present invention provides a positioning apparatus and method capable of receiving valid assistance positioning data from other positioning apparatuses and performing a positioning procedure according to the data, or receiving a positioning result from other positioning apparatuses and regarding the positioning result as coordinate information of the positioning apparatus. Therefore, the positioning apparatus and method according to the present invention is capable of providing stable and reliable positioning information and reducing positioning time. Furthermore, the positioning apparatus according to the present invention acquires associated positioning information from neighboring positioning apparatuses via wireless communication in real-time, so as to obtain coordinate information thereof and further achieve an object of updating the coordinate information in real-time.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A positioning apparatus, comprising:
    a wireless communication module, for generating a detection signal, for receiving a satellite signal and for receiving assistance positioning data;
    a storage unit, coupled to the wireless communication module, for storing the assistance positioning data;
    a positioning module, coupled to the storage unit, for generating coordinate information according to the satellite signal and the assistance positioning data; and
    a control unit, coupled to the wireless communication module, the storage unit and the positioning module, for determining whether the assistance positioning data stored in the storage unit is valid and controlling the wireless communication module to generate and transmit the detection signal when the assistance positioning data is invalid,
    wherein the wireless communication module is a radio frequency identification (RFID) communication module having a reader mode and a tag mode, and when the control unit determines that the assistance positioning data is invalid, the control unit controls the wireless communication module to enter the reader mode to generate and transmit the detection signal, and
    wherein the control unit controls the wireless communication module to enter the tag mode when determining that the assistance positioning data is valid, and the wireless communication module transmits the assistance positioning data stored in the storage unit to another positioning apparatus when the wireless communication module is operating in the tag mode.

2. The positioning apparatus as claimed in claim 1, wherein the detection signal is for detecting whether another positioning apparatus comprising valid assistance positioning data and a positioning result exists near the positioning apparatus, the wireless communication module establishes a communication link with the another positioning apparatus when the another positioning apparatus exists and receives the valid assistance positioning data and the positioning result, and the positioning result is regarded as the coordinate information of the positioning apparatus.

3. The positioning apparatus as claimed in claim 2, wherein the valid assistance positioning data is divided into a plurality of packets, each of which comprises remaining length information for indicating a packet length not yet transmitted.

4. The positioning apparatus as claimed in claim 3, wherein when transmission of the assistance positioning data is incomplete and the wireless communication module does not receive at least two packets within a predetermined time, the control unit deletes the received packets stored in the storage unit and controls the wireless communication module to transmit the detection signal again.

5. The positioning apparatus as claimed in claim 2, wherein when the valid assistance positioning data is completely transmitted, the control unit checks whether the valid assistance positioning data is correct according to a checksum, and when the result indicates that the valid assistance positioning data is incorrect, the control unit deletes the received packet stored in the storage unit and controls the wireless communication module to transmit the detection signal again.

6. The positioning apparatus as claimed in claim 1, wherein the control unit controls the wireless communication module to enter the tag mode when determining that the assistance positioning data is valid, and the wireless communication module receives the detection signal from another positioning apparatus when the wireless communication module is operating in the tag mode.

7. The positioning apparatus as claimed in claim 1, wherein the positioning apparatus has a first identification code and the another positioning apparatus has a second identification code, the another positioning apparatus transmits the second identification code to the positioning apparatus when the another positioning apparatus receives the detection signal, the positioning apparatus transmits the first identification code to the another positioning apparatus after receiving the second identification code, and the positioning apparatus establishes a communication link with the another positioning apparatus according to the first and the second identification codes.

8. A positioning method, applied to a positioning apparatus having stored therein assistance positioning data, the positioning method comprising steps of:
    determining whether the assistance positioning data is valid;
    generating a detection signal to detect whether another positioning apparatus comprising valid assistance positioning data and a positioning result exists near the positioning apparatus; and
    establishing a communication link with the another positioning apparatus, receiving the valid assistance positioning data and the positioning result and storing the same, and regarding the positioning result as coordinate information of the positioning apparatus,
    wherein the positioning apparatus comprises an RFID module having a reader mode and a tag mode and the step of generating the detection signal further comprises:
    controlling the RFID module to enter the reader mode to generate the detection signal when the assistance positioning data is determined to be invalid; and
    controlling the RFID module to enter the tag mode when the assistance positioning data is determined to be valid, and transmitting the assistance positioning data to another positioning apparatus when the RFID module is operating in the tag mode.

9. The positioning method as claimed in claim 8, wherein the RFID module receives the detection signal from other positioning apparatuses when the RFID module is operating in the tag mode.

10. The positioning method as claimed in claim 8, wherein the positioning apparatus has a first identification, the another positioning apparatus has a second identification code, and the step of establishing a communication link with the another positioning apparatus, receiving the valid assistance positioning data and the positioning result, and regarding the positioning result as coordinate information of the positioning apparatus further comprises:
　　transmitting the second identification code to the positioning apparatus when the another positioning apparatus receives the detection signal; and
　　transmitting the first identification code to the another positioning apparatus after the positioning apparatus receives the second identification code, wherein the positioning apparatus establishes the communication link with the another positioning apparatus according to the first and the second identification codes.

11. The positioning method as claimed in claim 8, wherein the valid assistance positioning data is divided into a plurality of packets, each of which comprises remaining length information for indicating a packet length not yet transmitted.

12. The positioning method as claimed in claim 11, wherein the step of establishing a communication link with the another positioning apparatus, receiving the valid assistance positioning data and the positioning result, and regarding the positioning result as coordinate information of the positioning apparatus further comprises:
　　deleting the received packets and transmitting the detection signal again when transmission of the assistance positioning data is incomplete and at least two packets are not received within a predetermined time.

13. The positioning method as claimed in claim 8, further comprising:
　　checking whether the valid assistance positioning data is correct according to a checksum when the valid assistance positioning data is completely transmitted; and
　　deleting the received packets and transmitting the detection signal again when the check result indicates that the valid assistance positioning data is incorrect.

\* \* \* \* \*